(No Model.)
C. W. STAMBAUGH.
EGG BEATER.
No. 362,858. Patented May 10, 1887.
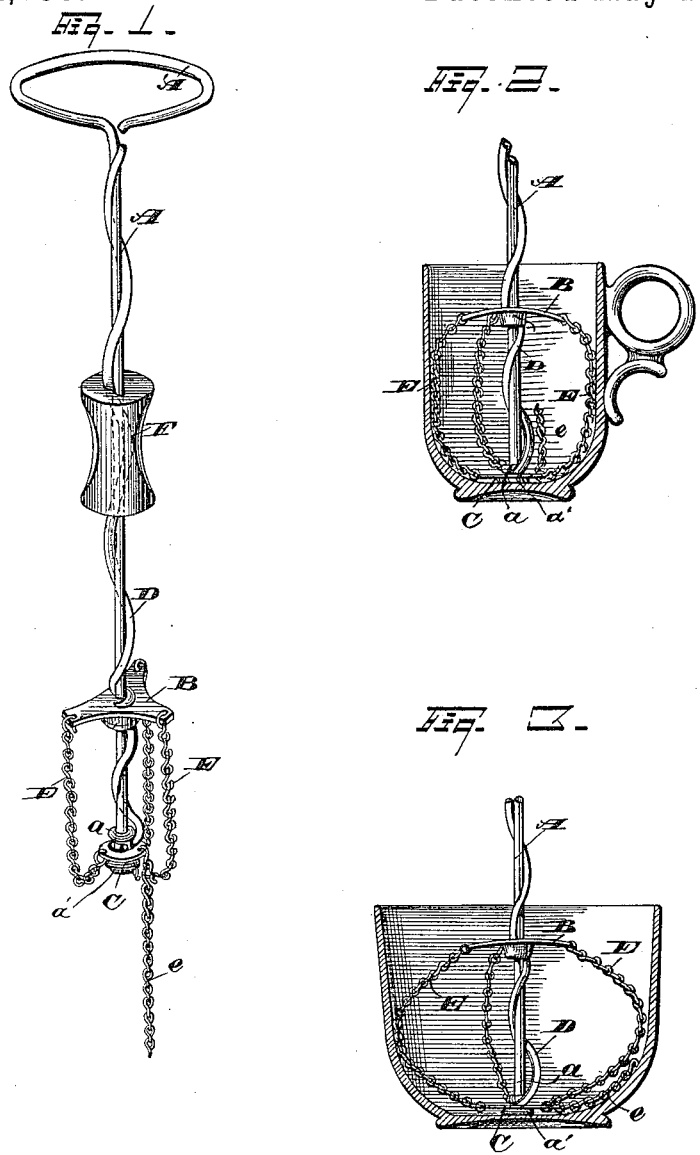

UNITED STATES PATENT OFFICE.

CHARLES W. STAMBAUGH, OF CLEVELAND, OHIO, ASSIGNOR TO CHARLES WETZIG, JR., OF SAME PLACE.

EGG-BEATER.

SPECIFICATION forming part of Letters Patent No. 362,858, dated May 10, 1887.

Application filed January 6, 1886. Serial No. 187,805. (No model.)

*To all whom it may concern:*

Be it known that I, CHARLES W. STAMBAUGH, of Cleveland, in the county of Cuyahoga and State of Ohio, have invented certain new and useful Improvements in Egg-Beaters; and I do hereby declare the following to be a full, clear, and exact description of the invention, such as will enable others skilled in the art to which it pertains to make and use the same.

My invention relates to improvements in egg-beaters in which a spindle is provided, having a handle at one end and having journaled on the other end a revolving head. A series of chains have respectively their two ends attached to the beater, leaving considerable slack in each chain, and a short depending chain is attached by one end to the bottom of the revolving head. To the head is rigidly secured a wire that is bent spirally around the spindle, and a thumb-nut is provided for the spiral to rotate the head by reciprocating the thumb-nut on the spindle, by means of which the chains are thrown outward and made to conform to the shape of the dish in which they are revolved, the depending chains sweeping the bottom of the dish, to the end that a cheap, convenient, and effective egg-beater is formed that can be made at a small initial cost.

In the accompanying drawings, Figure 1 is a side elevation of my improved egg-beater. Figs. 2 and 3 are enlarged elevations in section, showing the operation of the egg-beater in vessels of different form.

A represents a spindle having a handle, A'. A spider, B, and small disk C are journaled on the spindle and are connected by the wire D, so that the disk and spider form a head and revolve together. The wire D extends to near the handle A', and is coiled spirally and with a quick lead around the spindle as an axis. Collars $a$ and $a'$ are secured rigidly on the spindle to hold the head endwise on the spindle.

A thumb-nut, F, is arranged to slide on the spindle, and has an internal spiral groove to fit the wire D, by means of which, when the nut F is reciprocated on the spindle, the disk and spider are rotated alternately in opposite directions.

Chains E are respectively attached at one end to the extreme ends of the spider-arm and at the other ends to the disk, leaving considerable slack in the chains; also, a short chain, $e$, is attached to one side of the disk and depends when at rest as shown in Fig. 1.

In operating the device the centrifugal force expands the chains E laterally, so that they conform to the shape of the bowl, cup, or other vessel in which the eggs are being beaten. The chain $e$, being secured only at one end, has an erratic movement of its own at the bottom of the vessel, so that portions of the egg that would otherwise settle unbeaten at the bottom receive due attention.

I am aware that egg-beaters are in use having a series of wires pivoted to a revolving head and arranged to swing outward; but with such construction the egg at the bottom of the vessel is not likely to be thoroughly beaten.

I am aware that a chain adapted to move in contact with the bottom of a vessel and connected at its opposite ends to a revolving disk is not new. I am also aware that egg-beaters consisting of a central rod or spindle having a handle journaled thereto at its upper end, two or more wires wound spirally around and secured to the upper portion of the spindle, the lower ends of said wires forming beaters, and a nut engaging the spiral wires for rotating the spindle, are not new, and hence I make no claim to such constructions.

The device is not only simple and effective, but can be made at a trifling initial cost; also, the absence of gearing and similar devices usually resorted to in egg-beaters renders the device light to handle.

What I claim is—

1. In an egg-beater, the combination, with a spindle having a head journaled therein, chains secured to the head, substantially as indicated, of a spiral wire attached to the head loosely embracing the spindle, and a thumb-nut mounted on the spindle and engaging the spiral wire, the parts being arranged substantially as set forth.

2. In an egg-beater, the combination, with a spindle and attached handle, of a disk and spider journaled on the spindle respectively at different points, collars secured to the spindle for holding the disk and spider endwise, a wire connecting the spider and disk, said wire being coiled spirally and with a quick lead around the spindle, and a nut arranged to reciprocate on the spindle and to engage the spiral wire and rotate the same, substantially as set forth.

3. In an egg-beater, the combination, with a spindle, a revolving head journaled on the spindle, a wire connecting the two parts of the head, said wire being coiled spirally around the spindle, a nut mounted on the spindle and engaging the spirals of the wire, of chains connected respectively at each end to different points of the revolving head, and a chain connected at one end to the bottom of the head, the parts being arranged substantially as set forth.

In testimony whereof I sign this specification, in the presence of two witnesses, this 26th day of December, 1885.

CHARLES W. STAMBAUGH.

Witnesses:
ALBERT E. LYNCH,
CHAS. H. DORER.